A. LIETZ.
NAVIGATOR'S ALIDADE.
APPLICATION FILED DEC. 14, 1915.
1,218,422. Patented Mar. 6, 1917.
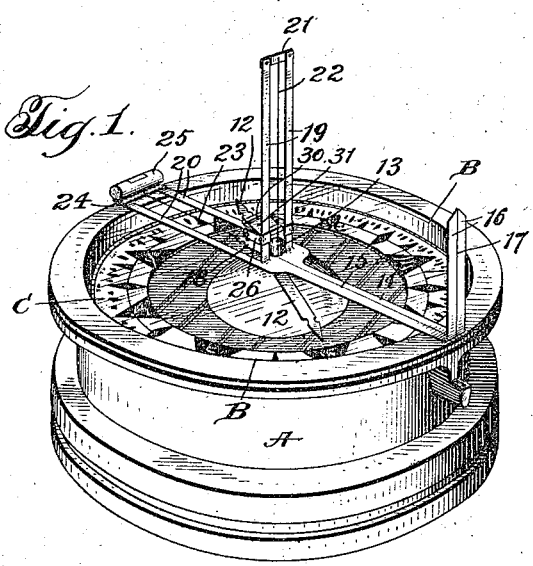
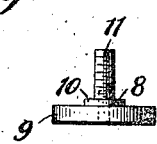
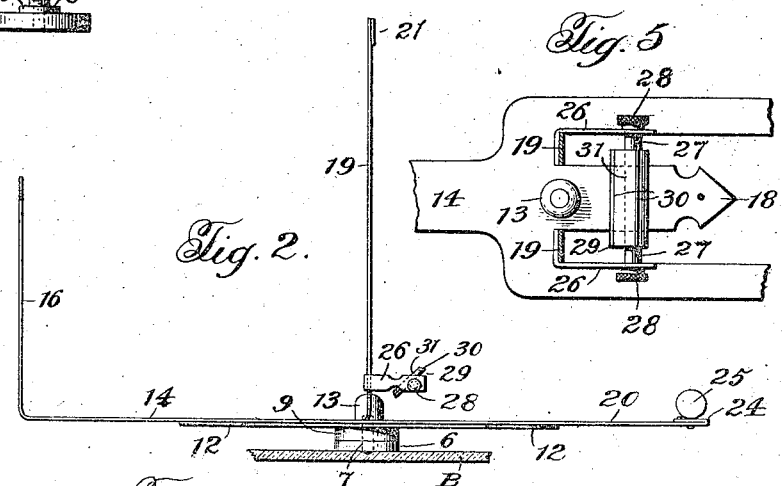
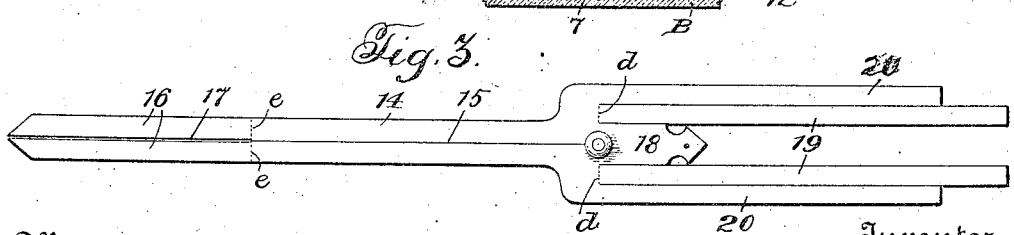

UNITED STATES PATENT OFFICE.

ADOLPH LIETZ, OF SAN FRANCISCO, CALIFORNIA.

NAVIGATOR'S ALIDADE.

1,218,422.

Specification of Letters Patent.

Patented Mar. 6, 1917.

Application filed December 14, 1915. Serial No. 66,754.

*To all whom it may concern:*

Be it known that I, ADOLPH LIETZ, a citizen of the United States, residing at San Francisco, in the county of San Francisco and State of California, have invented certain new and useful Improvements in Navigators' Alidades, of which the following is a specification, reference being had therein to the accompanying drawing.

This instrument is a navigator's alidade for use with compasses, peloruses, or other navigational devices for determining azimuths of heavenly bodies, or shore bearings.

It is an object of the invention to provide a simple instrument of this character that can be operated easily, for shore, sun, or star bearings, to indicate the direct and magnetic course within the limit of accuracy necessary for safe navigation, and the instrument is one that avoids the mistakes so easily made with those azimuth instruments that include complicated prisms and other parts.

The instrument can be used to read a magnetic course direct, to make observations at high and low altitudes, and to take land or shore bearings, and it will not affect the balancing of the compass.

The details of construction and arrangement of parts contemplated by the invention will be apparent from the description herein, when read in connection with the accompanying drawing, forming part hereof, wherein an embodiment of the invention is disclosed for purposes of illustration.

While the embodiment of the invention disclosed now is considered to exemplify a preferable form, it is to be understood that it is not the intention to be limited necessarily thereto in interpretation of the claims, as it is obvious that alterations within the limits of the claims can be made without departing from the nature and spirit of the invention.

Like reference-characters refer to corresponding parts in the views of the drawing, of which—

Figure 1 is a perspective view of the instrument associated with a compass;

Fig. 2 is a side view;

Fig. 3 is a top view, certain parts being shown as before bending to form the upstanding shadow-line standard and the sight-vane, and certain parts being omitted;

Fig. 4 is a view of the center-bearing; and

Fig. 5 is a top view showing the mirror and its support.

Having more particular reference to the drawing, A designates a compass having the usual glass cover B and card C.

A pivot-bearing, including a disk 6 and a pivot-pin 7 upstanding therefrom, is fastened to the compass-glass with the pivot-pin concentric with the compass-card, and the instrument is rotatable on this pivot-bearing.

A center bearing, having a boxing 8 to receive the pivot-pin, and comprising a disk 9, a smaller journal or shoulder 10 thereon, and an exteriorly screw-threaded standard or pin 11 upstanding therefrom, constitutes the member for rotatably holding the instrument on the pivot-bearing.

A variation-pointer 12 rests on the disk 9 and is rotatable on the shoulder 10, and resting on the shoulder and having the pin 11 projecting upwardly through it is the member that forms the azimuth instrument proper, the member being held down on the shoulder by a tap 13 screwed onto the top of pin 11.

The azimuth instrument proper is formed of sheet metal, properly shaped, cut, and bent to include a flat horizontal arm 14 affording a shadow-surface and having a line 15 extending longitudinally and centrally thereof; and upstanding perpendicularly from the end of this arm is a sight-vane 16 having a sighting-slot 17, which coincides with the line of the shadow-surface. At the opposite side from the shadow-surface and sight-vane, the material is slitted and cut and thereby formed with a central comparatively short horizontal central arm or pointer 18, on each side thereof arms 19, which are bent on the pivotal line of the instrument to position perpendicular to the shadow-surface and which constitute an upright standard, and outside thereof on each side horizontal arms 20. To the upper ends of the standard-arms 19 is connected a plate or the like 21, and held taut centrally between the arms and perpendicularly to the shadow-surface and connected to the plate 21 and to the tap 13 is a fine wire 22 constituting the shadow-line. A fine wire 23, constituting the reading-line, is held taut centrally between the horizontal arms 20 by connection to the arm 18 and to a plate 24 joining the ends of the arms 20. A level 25 is carried by the plate 24. The sight-vane slot 17, the line 15, the shadow-line 22, and the reading-line 23 all lie in the same vertical plane.

The member including the shadow-surface arm 18, sight-vane 16, short central arm 18, upright arms 19, and side arms 20, can be formed from a sheet-metal blank as shown by Fig. 3. After the metal is cut and slitted to bring it to the form shown, the upright arms are bent at the line $d$ and the sight-vane at the line $e$ to bring them to upstanding positions perpendicular to the surface of the blank.

Just above the tap 13, a bracket 26 is connected to and extends laterally from each of the standard-arms 19, and between the free end portions of the brackets is held a shaft 27 by adjusting-screws 28 passing through the brackets and into each end of the shaft, whereby the ends of the shaft are clamped against the inner surfaces of the brackets and the shaft held in adjusted position. Secured to the shaft is a plate 29, having inturned marginal flanges 30 holding on the plate a mirror 31. The mirror may be adjusted to desired position by loosening the adjusting-screws and rocking the shaft.

In use, the instrument is turned in azimuth until the reading-line 23 reads zero on the compass-card, the line being brought directly over the zero-mark on the card—for example, that at the north cardinal point—by sighting through the shadow-line 22 and the reading-line at the same time. Then the variation-pointer 12 is set, east or west, equal to the amount of variation ascertained from a variation-table for the place at which the instrument is being used. The instrument then is turned until the sun's shadow of the line 22 covers the line 15 on arm 14. If the reading of the variation-pointer on the compass-card is the same as the sun's azimuth at the time of observation, the compass is magnetically correct; if not, it shows the amount of deviation. Azimuth to the right of the variation-pointer is easterly deviation, and azimuth to the left of the variation-pointer is westerly deviation. The emergency or star mirror 31 is used when the sun is not bright enough to throw a shadow, or when observing a star, and then the observation is made through the sight-vane 16.

Having thus described my invention, what I claim as new, and desire to secure by Letters Patent, is—

1. An alidade, arranged to be pivotally associated with a compass, pelorus, or other navigational instrument, and comprising a normally horizontal arm affording a shadow-surface having a line longitudinally thereof, a suitably supported normally horizontal reading-line, a suitably supported normally vertical shadow-line, and a sight-vane having a sighting-slot, said shadow-surface line, reading-line, shadow-line, and sight-vane slot all lying in the same plane.

2. An alidade, arranged to be pivotally associated with a compass, pelorus, or other navigational instrument, and including at one side of the pivotal point an arm affording a shadow-surface having thereon a longitudinal line, at the other side of the pivotal point a suitably supported reading-line, a normally vertical shadow-line suitably supported coaxially of the instrument, and an upstanding sight-vane having a sighting-slot, said shadow-surface line, reading-line, shadow-line, and sight-vane slot all lying in the same plane.

3. An alidade, arranged to be pivotally associated with a compass, pelorus, or other navigational instrument, and comprising the combination of a center bearing, and rotatable thereon a variation-pointer and a member including at one side of the pivotal point an arm affording a shadow-surface having thereon a longitudinal line, at the other side of the pivotal point a suitably supported reading-line, a normally vertical shadow-line suitably supported coaxially of the instrument, and an upstanding sight-vane having a sighting-slot, said shadow-surface line, reading-line, shadow-line, and a sight-vane slot all lying in the same plane.

4. An alidade, arranged to be pivotally associated with a compass, pelorus, or other navigational instrument, and including at one side of the pivotal point an arm affording a shadow-surface having thereon a longitudinal line, at the other side of the pivotal point two arms extending from said shadow-surface arm and having at their outer ends a connecting-piece, a member extending from said shadow-surface arm between said two arms, a reading-line connected to said connecting piece and to said member and held taut between said two arms, a normally vertical shadow-line suitably supported coaxially of the instrument, and an upstanding sight-vane having a sighting-slot, said shadow-surface line, reading-line, shadow-line, and sight-vane slot all lying in the same plane.

5. An alidade, arranged to be pivotally associated with a compass, pelorus, or other navigational instrument, and including at one side of the pivotal point an arm affording a shadow-surface having thereon a longitudinal line, at the other side of the pivotal point a suitably supported reading-line, two arms upstanding from said shadow-surface arm at the pivotal point and having a connecting-piece at their top, a shadow-line connected to said connecting-piece and fastened at its lower end and thereby held taut between said two arms coaxially of the instrument, and an upstanding sight-vane having a sighting-slot, said shadow-surface line, reading-line, shadow-line, and sight-vane slot all lying in the same plane.

6. An alidade, arranged to be pivotally associated with a compass, pelorus, or other navigational instrument, and comprising the combination of an arm affording a shadow-surface having thereon a longitudinal line at one side of the pivotal point, at the other side of the pivotal point a suitably supported reading-line, two arms upstanding from said shadow-surface arm at the pivotal point and having a connecting-piece at their top, a shadow-line connected to said connecting-piece and fastened at its lower end and thereby held taut between said two arms coaxially of the instrument, an upstanding sight-vane having a sighting-slot, said shadow-surface line, reading-line, and sight-vane slot all lying in the same plane, and a mirror adjustably supported by said upstanding arms.

7. An alidade, arranged to be pivotally associated with a compass, pelorus, or other navigational instrument, and comprising the combination of an arm affording a shadow-surface having thereon a longitudinal line at one side of the pivotal point, at the other side of the pivotal point a suitably supported reading-line, two arms upstanding from said shadow-surface arm at the pivotal point and having a connecting-piece at their top, a shadow-line connected to said connecting-piece and fastened at its lower end and thereby held taut between said two arms coaxially of the instrument, an upstanding sight-vane having a sighting-slot, said shadow-surface line, reading-line, and sight-vane slot all lying in the same plane, a bracket extending laterally from each of said upstanding arms, and a mirror adjustably held between said brackets.

8. An alidade, arranged to be pivotally associated with a compass, pelorus, or other navigational instrument, and comprising the combination of an arm affording a shadow-surface having thereon a longitudinal line at one side of the pivotal point, at the other side of the pivotal point a suitably supported reading-line, two arms upstanding from said shadow-surface arm at the pivotal point and having a connecting-piece at their top, a shadow-line connected to said connecting-piece and fastened at its lower end and thereby held taut between said two arms coaxially of the instrument, an upstanding sight-vane having a sighting-slot, said shadow-surface line, reading-line, and sight-vane slot all lying in the same plane, a bracket extending laterally from each of said upstanding arms, a shaft between said brackets, adjusting-screws adjustably clamping the ends of said shaft against said brackets, and a mirror carried by said shaft.

9. In an alidade arranged to be pivotally associated with a compass, pelorus, or other navigational instrument, the combination of a pivot-bearing having an upstanding pin, a center bearing having a boxing receiving said pivot-pin and comprising a base and a shoulder and a standard, a variation-pointer rotatable on said center-bearing shoulder, and resting on said shoulder and held in place by said standard, a member comprising a normally horizontal shadow-surface arm having a line longitudinal thereof, a suitably supported normally horizontal reading-line, a suitably supported normally vertical shadow-line, and a sight-vane having a sighting-slot, said shadow-surface line, reading-line, shadow-line, and sight-vane slot all lying in the same plane.

10. An alidade, arranged to be pivotally associated with a compass, pelorus, or other navigational instrument, and comprising a normally horizontal shadow-surface arm having a line longitudinal thereof, a suitably supported normally horizontal reading-line, a suitably supported normally vertical shadow-line, and a sight-vane having a sighting-slot, said shadow-surface line, reading-line, shadow-line, and sight-vane slot all lying in the same plane, and means whereby to indicate when said plane is vertical.

11. An alidade, arranged to be pivotally associated with a compass, pelorus, or other navigational instrument, and including at one side of the pivotal point an arm affording a shadow-surface having thereon a longitudinal line, at the other side of the pivotal point two arms extending from said shadow-surface arm and having at their outer ends a connecting-piece, a level on said connecting-piece, a member extending from said shadow-surface arm between said two arms, a reading-line connected to said connecting-piece and to said member and held taut between said two arms, a normally vertical shadow-line suitably supported coaxially of the instrument, and an upstanding sight-vane having a sighting-slot, said shadow-surface line, reading-line, shadow-line, and sight-vane slot all lying in the same plane.

In testimony whereof I affix my signature.

ADOLPH LIETZ.